Figure 1:
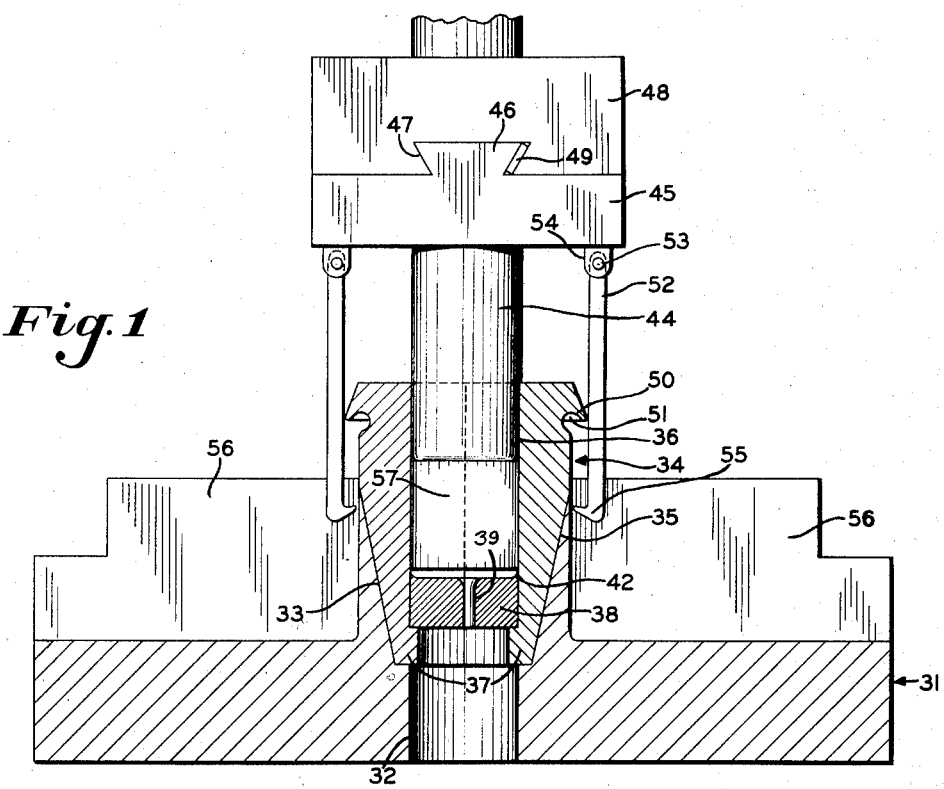

Nov. 18, 1958  C. A. BRAUCHLER  2,860,775
SPLIT DIE AND CONTAINER FOR EXTRUSION PRESS
Filed Oct. 5, 1954  4 Sheets-Sheet 1

INVENTOR.
Charles A. Brauchler
BY
Frease & Bishop
ATTORNEYS

Nov. 18, 1958 C. A. BRAUCHLER 2,860,775
SPLIT DIE AND CONTAINER FOR EXTRUSION PRESS
Filed Oct. 5, 1954 4 Sheets-Sheet 3

INVENTOR.
Charles A. Brauchler
BY
Frease & Bishop
ATTORNEYS

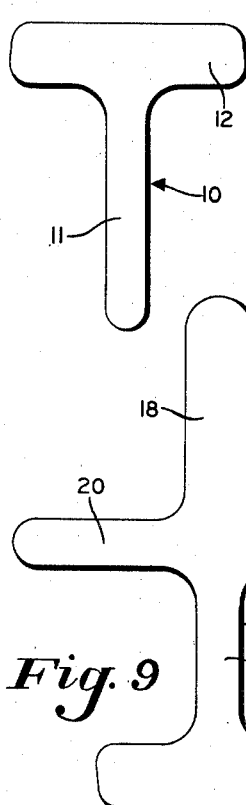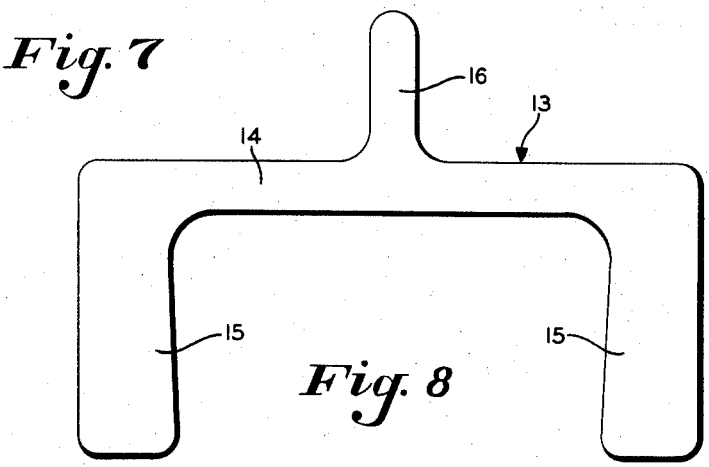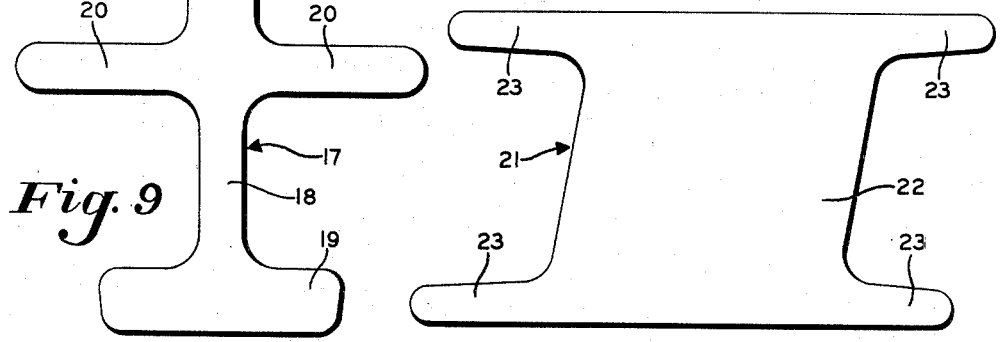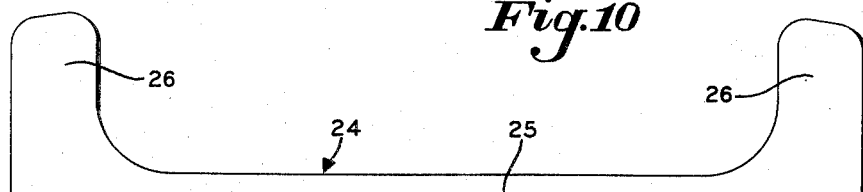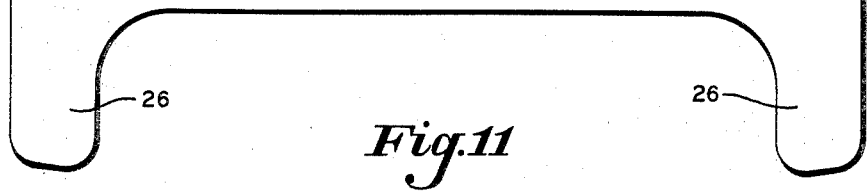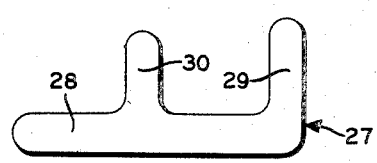

United States Patent Office 2,860,775
Patented Nov. 18, 1958

2,860,775

SPLIT DIE AND CONTAINER FOR EXTRUSION PRESS

Charles A. Brauchler, Canton, Ohio

Application October 5, 1954, Serial No. 460,461

2 Claims. (Cl. 207—17)

The invention relates to the extrusion of structural bars or beams, or similar cross-sectional shapes, from heated blanks of alloy or carbon steels and similar metals.

In the extrusion of such shapes, a heated bar blank or block of metal is placed in a cylinder or chamber, and, by means of a plunger, the heated metal is extruded through a die having an opening of the cross-sectional shape desired in the structural member.

Under present practice, difficulty is often experienced in removing the extruded structural member from the die, owing to the fact that all of the metal of the blank is not extruded through the die opening, leaving a relatively thin head of the diameter of the interior of the cylinder, upon the tail end of the extruded member.

This head must be removed in order to permit the extruded member to pass through the die, or the extruded member must be withdrawn upwardly or backwardly through the die opening.

It is therefore an object of the present invention to provide apparatus for extruding such shaped members, which overcomes the above-mentioned difficulties and disadvantages of present practice.

Another object is to provide an extrusion press in which the extrusion chamber is formed of two similar halves, adapted to be mounted in a suitable opening in a die block, and in which the die is formed of two similar halves detachably mounted in the two halves of the extrusion chamber.

A further object is to provide such apparatus in which the separable halves forming the extrusion chamber are wedge fitted within the die block, whereby pressure of the plunger in the extrusion operation tends to force the two halves of the extrusion chamber tightly together.

A still further object is to provide extrusion apparatus of the character referred to having means for withdrawing the separable halves of the extrusion chamber from the die block, after the extrusion operation has been completed, causing the lower ends thereof to swing away from each other, and permitting the extruded member to drop out of the die.

The above and other objects apparent from the drawings and following description, may be attained, the above described objections and disadvantages overcome and the advantages and results obtained, by the apparatus, construction, arrangement and combinations, sub-combinations and parts, which comprise the present invention, a preferred embodiment of which, illustrative of the best mode in which applicant has contemplated applying the principle, being illustrated in the accompanying drawings and set forth in detail in the following description.

In general terms, the invention may be stated as comprising a cylinder formed of two similar, separable halves, each of which is downwardly tapered exteriorly so as to have a wedge fit in a tapered opening in a die block.

A peripheral shoulder is provided in the lower end of the cylinder, upon which is seated a separable pair of dies having mating openings therein of any desired cross-sectional shape to be produced in the extruded member.

The invention also includes means for raising the separable halves of the cylinder out of the die block, at the end of the extrusion operation, causing them to separate, permitting the extruded member to drop therefrom.

Figure 2:
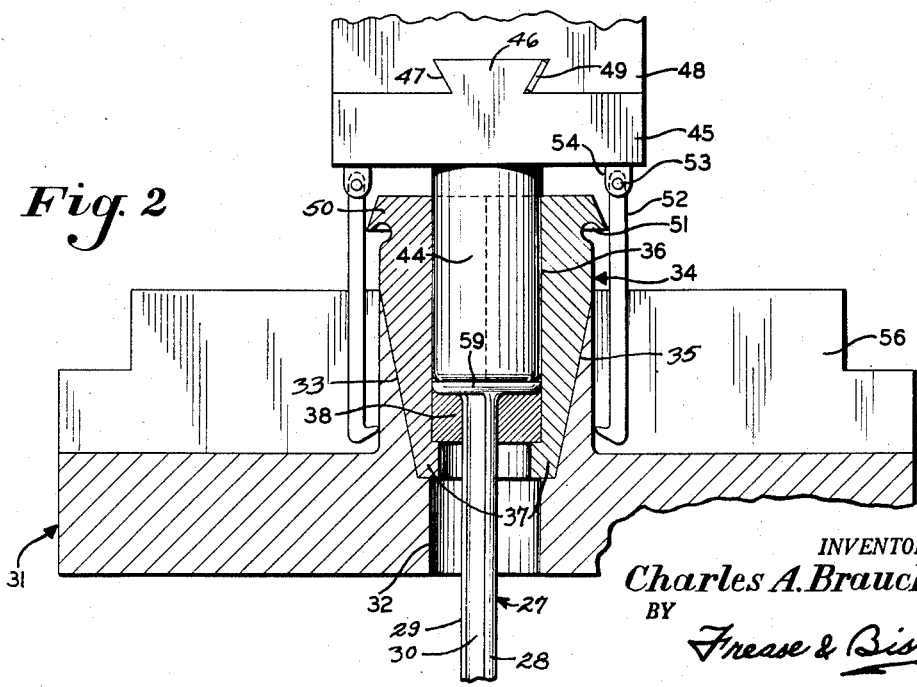
Figure 3:
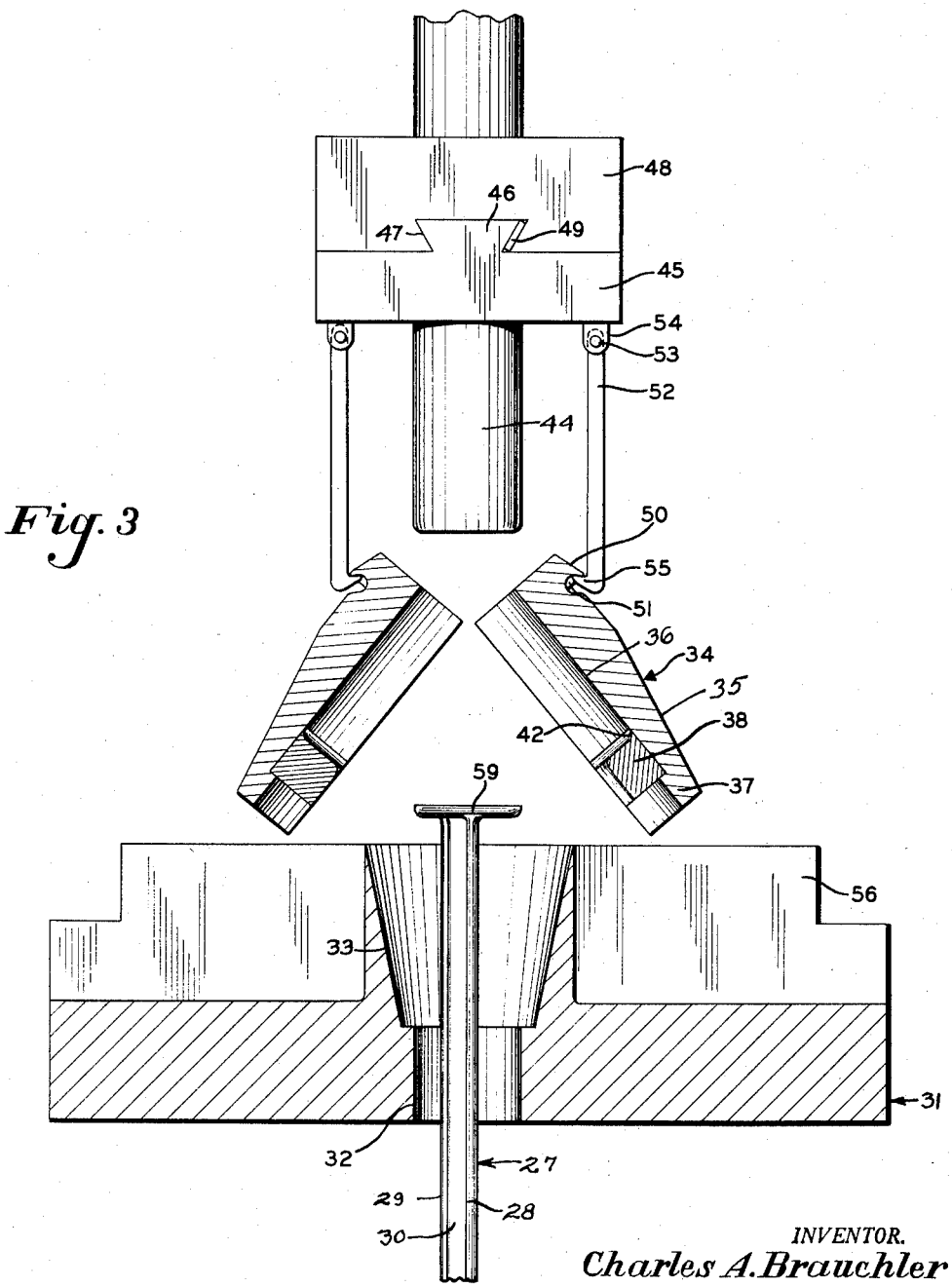
Figure 4:
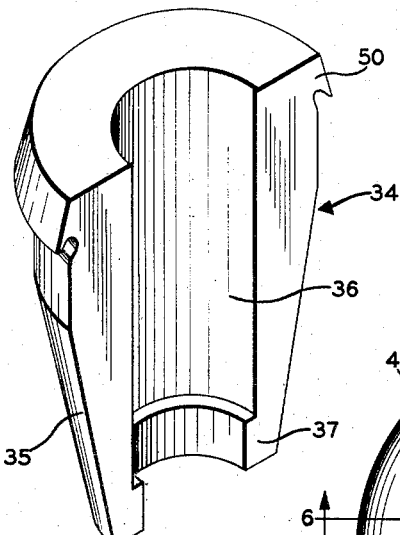
Figure 5:
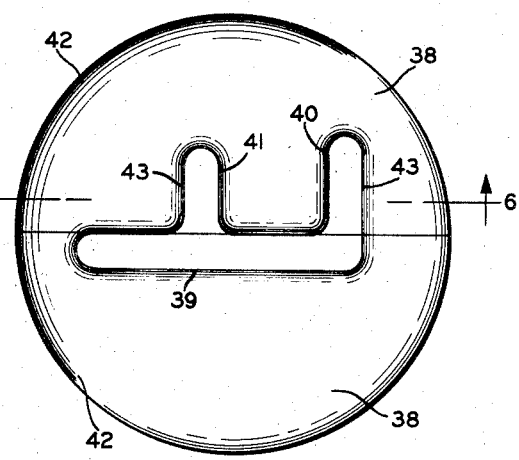
Figure 6:
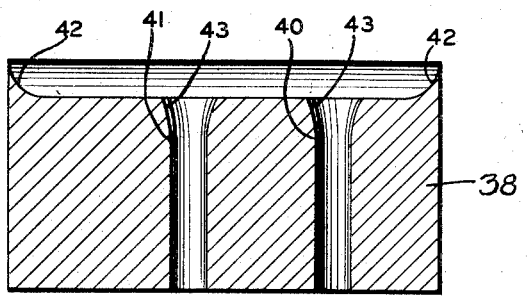

Having thus described the invention in general terms, a preferred embodiment thereof is illustrated in the accompanying drawings, in which;

Fig. 1 is a vertical, sectional view through an extrusion press constructed in accordance with the invention, showing a heated bar blank or block positioned in the extrusion chamber, adjacent to the die, and the plunger in position to extrude the same through the die openings;

Fig. 2 a similar view showing the position of the parts at the completion of the extrusion operation;

Fig. 3 a similar view showing the separable halves of the extrusion chamber raised out of the die block, and separated, permitting the extruded member to fall therefrom;

Fig. 4 a detached, perspective view of one of the separable members of the extrusion chamber;

Fig. 5 a detached, top plan view of a pair of dies such as are located in the separable extrusion chamber;

Fig. 6 a transverse section through one of the die members, taken as on the line 6—6, Fig. 5;

Fig. 7 an end elevation of an extruded member of substantially T-shape cross section;

Fig. 8 an end elevation of an extruded member of modified channel cross section;

Fig. 9 an end elevation of an extruded member of a combined T-shape and cross-shape cross-section;

Fig. 10 an end elevation of an extruded member having a cross-sectional shape in the form of a parallelogram with oppositely disposed flanges at its corners;

Fig. 11 an end elevation of an extruded member of substantially I-beam cross-sectional shape; and, Fig. 12 an end elevation of an extruded member of substantially F-shape cross section.

Reference is now made to the drawings in which similar numerals refer to similar parts throughout.

Structural bars and other extruded members of various cross-sectional shapes are used in the construction of aircraft and similar structures. Examples of some of the cross-sectional shapes more or less commonly used for such purposes are illustrated in Figs. 7 to 12.

A bar or modified T-shape cross section is generally indicated at 10 in Fig. 7, having the upright flange 11 with the cross bar 12 of greater thickness at its upper edge.

In Fig. 8 is shown an extruded member of a modified channel cross-sectional shape, as indicated generally at 13. This bar comprises the web 14 with relatively thick flanges 15 at opposite edges thereof, and a rib or flange 16, of reduced cross-sectional thickness, in the center of the web and disposed outwardly from the channel.

An extruded bar, having a combined cross and T-shape cross section, is indicated generally at 17 in Fig. 9 and comprises the upright flange or web 18 with cross bar 19 of greater thickness at one end, the opposite end of the web or flange 18 being of increased cross-sectional thickness, and oppositely disposed flanges 20 being located intermediate the ends of the flange 18.

In Fig. 10 is shown an extruded member indicated generally at 21, comprising the comparatively heavy parallelogram cross section 22 with oppositely disposed parallel flanges 23 at its corners, forming oppositely angled channels on two opposite sides of the bar.

In Fig. 11 is shown a substantially I-beam structural bar, indicated generally at 24, which comprises the web 25 with thickened cross bars or flanges 26 at opposite ends thereof.

In Fig. 12 is shown an extruded member of substantially F-shape cross section, indicated generally at 27, and comprising the relatively thick web 28 with thinner flanges 29 and 30 perpendicular thereto and located at one end and at an intermediate point respectively, of web.

The extruded members illustrated in Figs. 7 to 12 and briefly described above, are merely given as examples of some of the shapes which may be extruded, and it should be understood that it is not applicant's intention to limit the invention to the production of these specific structural shapes, as the invention is applicable to any cross sectional shape which may be extruded.

These extruded members are ordinarily formed of alloys or carbon steels. In the extrusion operation, a bar blank or block of the metal, of suitable size to form a structural member of desired length and cross-sectional shape, is first heated to extrusion temperature, approximately 2000° F. or higher, depending upon the analysis of the metal used, and the heated blank is then placed in the cylinder or chamber of the extrusion press and forced through the die opening by extreme pressure, such as by a hydraulically operated plunger or the like.

Referring now more particularly to the extrusion apparatus which is illustrated in Figs. 1 to 6 inclusive, a die block, indicated generally at 31, is mounted upon the bed of a hydraulic press or the like. This die block has a substantially central, vertical opening 32 therein, the upper end portion of the opening being upwardly flared, or of frusto-conical shape, as indicated at 33.

The extrusion chamber is formed of two similar cylinder halves, each indicated generally at 34, the exteriors thereof being downwardly tapered, as indicated at 35, so as to have a wedge fit in the downwardly tapered upper portion 33 of the central opening 32 of the die block 31.

Each of the members 34 has the half-cylindrical opening 36 therein, whereby, when the members are assembled in the die block as shown in Figs. 1 and 2, the mating openings 36 form a cylindrical opening. The lower end of each half 34 is provided with an inwardly disposed, annular shoulder 37 for the purpose of supporting the extrusion die thereon. The extrusion chamber may be of circular, square, rectangular or other cross-sectional shape.

This die, as best shown in Fig. 5, is formed of two similar, semi-circular halves 38 having a sliding fit in the cylindrical opening 36 of the extrusion chamber and provided at their meeting edge portions with mating openings of the cross-sectional shape desired in the extruded member.

In the drawings, for the purpose of illustration, the die opening is shaped to produce the substantially F-shape cross section of Fig. 12. For this purpose, a diametric groove 39 is formed in the mating edge of one of the die sections 38, adapted to cooperate with the perpendicular openings 40 and 41 in the other die section.

The elongated groove 39 thus forms the web portion 28 of the structural member 27, and the perpendicular slots 40 and 41, in the other die member, form the flanges 29 and 30 respectively, of the structural bar.

In order to cause the heated metal to flow more readily toward the die opening, the upper surfaces of the die members 38 may be peripherally concaved as at 42.

In the extrusion of such metals, it frequently happens that relatively thin cross-sectional parts of the structural member are not completely filled. For the purpose of urging the metal to flow more readily into such thin portions of the die openings, the upper ends of these portions 40 and 41 of the die openings may be upwardly flared, as indicated at 43 in Fig. 6.

A plunger 44 is provided for vertical sliding movement within the cylinder opening 36. This plunger may be attached at its upper end to a cross head 45, having a dove-tail rib 46 thereon adapted to be received in the usual dove-tail groove 47 in the vertically movable head 48 of the press, the usual wedge being driven into the dove-tail opening 47, and against the rib 46, for securely attaching the cross head 45 to the head of the press, as indicated at 49.

The upper ends of the extrusion chamber halves 34 are provided with the external shoulders 50, and each shoulder is provided with an inwardly and upwardly disposed angular notch or socket 51. For the purpose of raising the halves 34 out of the die block 31, after the extrusion operation is completed, upon upward movement of the plunger 44, depending hooks 52 may be pivotally connected as at 53 to the lugs 54 upon the underside of the cross head 45.

The lower hooked ends 55 of these hook members are adapted to be received in the diametrically opposed slots 56 in the die block 31, during the extrusion operation, as shown in Figs. 1 and 2.

After the extrusion operation is completed, upon upward movement of the plunger, the hooked ends 55 of the hook members 52 will engage in the angular notches 51 at the upper ends of the cylinder halves 34, pulling the same upward, out of the upwardly flared opening 33 of the die block 31, and permitting them to separate and swing apart as shown in Fig. 3.

In the operation of the improved extrusion apparatus above described, a bar blank or block of metal 57, of suitable size to produce an extruded member of the required cross-sectional size and length, is heated to approximately 2000° F., or higher, depending upon the analysis of the metal being used, and is placed in the bottom of the cylinder opening 36, in the position indicated in Fig. 1.

It should be understood that at this time the head 48 of the press is in raised position, so that the plunger 44 is located considerably above the top of the extrusion chamber.

The head 48 is then lowered, inserting the plunger 44 into the extrusion chamber or cylinder, in contact with the heated blank 57, as shown in Fig. 1, and continued downward movement of the plunger will force the heated metal of the blank 57 through the die opening, producing the extruded member 58 as shown in Fig. 2.

As the plunger 44 reaches the lower position, shown in Fig. 2, substantially all of the metal will have been extruded through the die opening, leaving only a relatively thin head 59 at the upper end thereof.

The head 48 of the press may then be raised, carrying with it the plunger and the hook members 52. The hooked ends 55 of these hook members will engage in the angular notches 51 at the upper ends of the cylinder halves 34, pulling the same upwardly out of the opening 33 of the die block and causing them to swing apart, as shown in Fig. 3, releasing the head portion 59 at the upper end of the extruded member 58 and permitting the same to drop through the opening 32 in the die block, as indicated in Fig. 3. This head 59 may then be cut from the upper end of the extruded member 58 and the same is ready for use.

From the above it will be seen that an efficient, durable and easily operated apparatus is provided which overcomes the objections and disadvantages of present practice.

It will also be obvious that upon raising the head of the press, to withdraw the plunger from the cylinder, the two halves of the extrusion chamber or cylinder will be pulled upwardly, out of the opening in the die block, and caused to separate so as to permit the extruded member to be released and fall away therefrom.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Extrusion apparatus comprising a stationary die block having a vertical opening therethrough, the upper end of said opening being upwardly flared, a pair of similar downwardly tapered cylinder halves fitting in the flared upper end of said opening and having mating half-cylindrical openings therein forming an extrusion chamber to receive a metal blank, an internal annular shoulder at the lower end of each half-cylindrical opening, an external shoulder at the upper end of each cylinder half, a die half located within the lower portion of the half-cylindrical opening in each cylinder half and seated upon the internal annular shoulder therein, said die halves having mating die openings therein, a vertically movable head above the extrusion chamber, a plunger carried by said head and slidable into the extrusion chamber to extrude the metal of the blank from the extrusion chamber through the cavities of the die halves with a relatively thin integral head at the top of the extruded metal remaining in the extrusion chamber, and hooks depending from said head for engaging said external shoulders for raising the cylinder halves out of the opening in the block upon upward movement of the head, so that said cylinder halves will pivot upon said hooks and the lower ends of the cylinder heads with the die halves therein will swing apart releasing the head on the extruded metal from said die halves, so that the extruded metal may drop through the opening in the stationary die block.

2. Extrusion apparatus comprising a stationary die block having a vertical opening therethrough, the upper end of said opening being upwardly flared, a pair of similar downwardly tapered cylinder halves fitting in the flared upper end of said opening and having mating half-cylindrical openings therein forming an extrusion chamber to receive a metal blank, an internal annular shoulder at the lower end of each half-cylindrical opening, an external shoulder at the upper end of each cylinder half, a die half located within the lower portion of the half-cylindrical opening in each cylinder half and seated upon the internal annular shoulder therein, said die halves having mating die openings therein, a vertically movable head above the extrusion chamber, a plunger carried by said head and slidable into the extrusion chamber to extrude the metal of the blank from the extrusion chamber through the cavities of the die halves with a relatively thin integral head at the top of the extruded metal remaining in the extrusion chamber, and hooks pivotally mounted upon and depending from said head for engaging said external shoulders for raising the cylinder halves out of the opening in the block upon upward movement of the head, so that said cylinder halves will pivot upon said hooks and the lower ends of the cylinder heads with the die halves therein will swing apart releasing the head on the extruded metal from said die halves, so that the extruded metal may drop through the opening in the stationary die block.

References Cited in the file of this patent

UNITED STATES PATENTS

| | | |
|---|---|---|
| 450,131 | Bishop | Apr. 14, 1891 |
| 1,379,717 | Parsons et al. | May 31, 1921 |
| 1,918,858 | Metzger | July 18, 1933 |
| 2,389,876 | Sequin | Nov. 27, 1945 |
| 2,700,906 | Allen | Feb. 1, 1955 |